Jan. 23, 1934.  J. H. CRARY  1,944,785
INTERNAL COMBUSTION ENGINE
Filed June 7, 1932   2 Sheets-Sheet 1

INVENTOR
James H. Crary
BY Munn & Co.
ATTORNEY

WITNESSES

Jan. 23, 1934.  J. H. CRARY  1,944,785
INTERNAL COMBUSTION ENGINE
Filed June 7, 1932   2 Sheets-Sheet 2

WITNESSES

INVENTOR
James H. Crary
BY
ATTORNEYS

Patented Jan. 23, 1934

1,944,785

UNITED STATES PATENT OFFICE 1,944,785

INTERNAL COMBUSTION ENGINE

James H. Crary, Westport, N. Y.

Application June 7, 1932. Serial No. 615,889

7 Claims. (Cl. 123—69)

This invention relates to internal combustion engines, and constitutes an improvement on the engine disclosed in Patent Number 1,722,201, granted to me on July 23, 1929.

This is a two-cycle engine, and as the piston reaches the lower end of its working stroke air is forced into the cylinder, forcing out the burnt gases through a port which is uncovered by the piston, and during a portion of the upward stroke of the piston an auxiliary exhaust valve remains open for the desired length of time to permit complete scavenging and to regulate the compression pressure. As this valve closes a fuel inlet valve is opened and the fuel mixture is forced into the air as the piston moves upwardly on its compression stroke.

It is the primary object of the present invention to so regulate the timing of the opening of the several ports as to regulate the mixture of air and gas.

My improved engine accomplishes this desired result by advancing the opening and closing of the fuel intake valve as the opening and closing of the auxiliary exhaust valve is retarded, and to accomplish this result I provide manually operated means for controlling the positions of the valve operating mechanisms with relation to the drive shaft of the engine.

With these and other objects in view, the invention consists in certain novel features of construction and combinations and arrangements of parts, all of which will be more fully hereinafter described and pointed out in the claims.

In the accompanying drawings—

Figure 2:
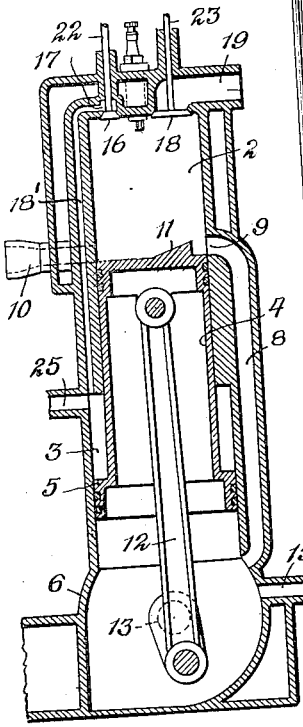
Figure 2 is a somewhat diagrammatic view in longitudinal section through the engine.
Figure 1:
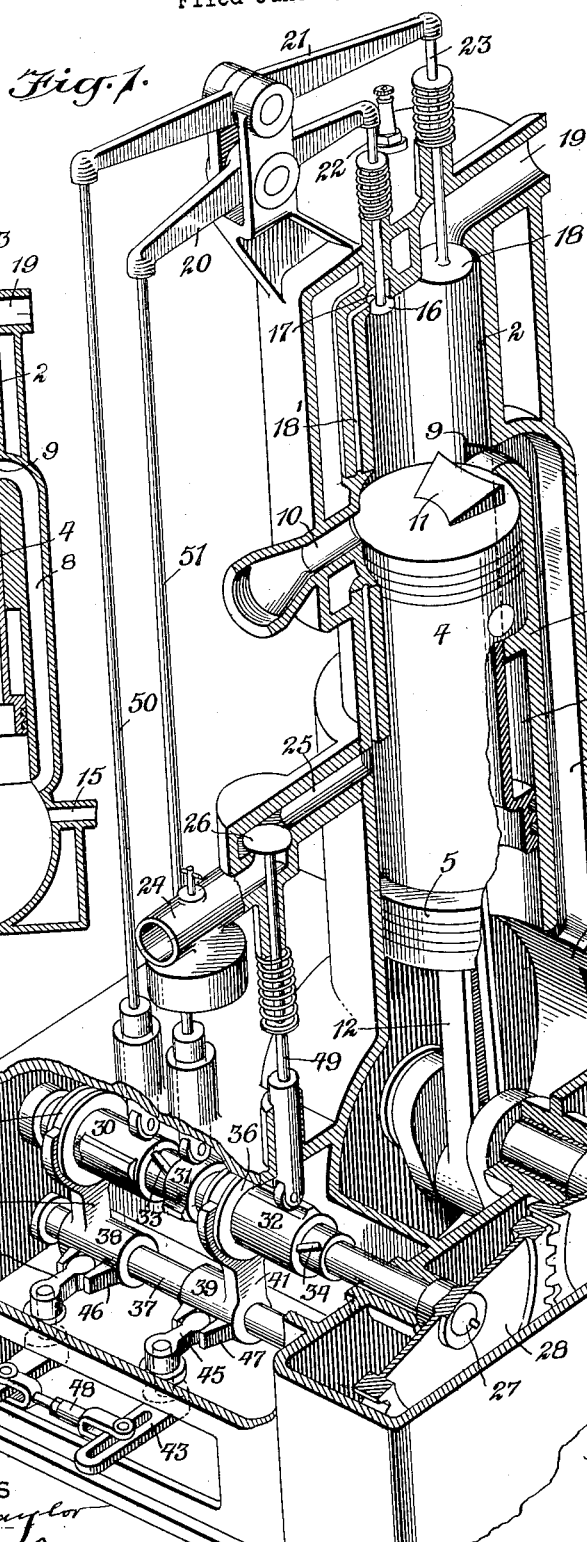
Figure 1 is a broken perspective view illustrating my improved engine; the view is broken mainly through a longitudinal section of the engine cylinder and co-operating parts, and the base portion is broken out in a horizontal section to illustrate operating mechanism within the base.

Referring more particularly to Figures 1 and 2 of the drawings, 1 represents an engine cylinder of two internal diameters; the upper end of the cylinder, constituting the smaller diameter, is an explosion chamber 2, and the lower larger internal diametered portion of the cylinder constitutes a fuel mixture compression chamber 3. A working piston 4 is mounted in the cylinder and has an enlarged lower end which constitutes a compression piston 5 reciprocating in the chamber 3. The cylinder may constitute a part of a base 6 and has a crank case 7 which constitutes an air compression chamber, and is connected by a by-pass 8 with an air inlet port 9 in the cylinder 1, which is opposite an exhaust port 10, and the piston 4 is preferably provided with a baffle 11 to cause the air to circulate freely in the cylinder in exhausting the burnt gases.

As is customary, a connecting rod 12 connects the piston 4 with a crank shaft 13 mounted in the crank case 7, and a check valve 14 normally closes an air inlet passage 15 communicating with the crank case 7. A fuel inlet valve 16 controls a fuel inlet port 17, and this port 17 communicates with a by-pass 18' in the cylinder wall connecting the compression chamber 3 with said port. An auxiliary exhaust valve 18 is also provided in the upper end of the cylinder 1 and controls an exhaust port 19. These valves 16 and 18 are positively operated through the medium of rocker-arms 20 and 21, respectively, engaging the stems 22 and 23, respectively, of said valves.

The reference character 24 is used to indicate a carburetor which may be controlled in any ordinary manner, and which communicates with the fuel inlet passage 25 communicating with the compression chamber 3, and a valve 26 is provided in this passage 25 to control the flow of fuel mixture.

A countershaft 27 is mounted in the base 6 and is driven through the medium of intermeshing gears 28 and 29 on said countershaft 27 and drive shaft 13, respectively. On the countershaft 27 three cams 30, 31 and 32, respectively, are mounted. The intermediate cam 31 is fixed on the shaft but the end cams 30 and 32, or cams at the opposite sides of the cam 31, are mounted to slide on the shaft 27 and are keyed to said shaft by cam keys 33 and 34, respectively. Cams 30 and 32 have grooved collars 35 and 36, respectively, thereon. Adjacent the shaft 27 and parallel therewith is a rod 37 secured in the base and on which sleeves 38 and 39 are mounted to slide. These sleeves 38 and 39 have forks 40 and 41, respectively, fixed to the sleeves and engaging in the grooved collars 35 and 36 so that when these sleeves 38 and 39 are moved longitudinally of the rod 37 they will operate to shift the cams 30 and 32 on their cam keys 33 and 34 respectively, so as to vary the timing of the mechanism operating said cams as hereinafter described.

As a means for manually shifting the cams, I illustrate a pair of pivoted levers 42 and 43 secured in the base 6 and having crank arms 44 and 45, respectively, thereon engaging in bifurcated brackets 46 and 47, respectively, on the sleeves 38 and 39. These levers 42 and 43 are connected by a link 48, one of said levers, preferably lever 42, is extended and constitutes a hand lever for manually operating the mechanism to shift the cams 30 and 32. The cam 32 operates a stem 49 connected to the fuel intake valve 26; the cam 30 operates a rod 50 connected to the rocker-arm 21 of the auxiliary exhaust valve 18, and the cam 31 operates a rod 51 connected to the rocker-arm 20 of the fuel inlet valve 16.

The operation of the engine above described is as follows:—

Figures 1 and 2 illustrate the position of the working piston on the completion of its working stroke, the working piston uncovering the main exhaust port 10 and the air intake port 9. As the downward stroke of the piston compresses the air in the crank case 7 this air under pressure is forced through the by-pass 8 and port 9 into the explosion chamber 2 to force out the burnt gases. As the piston 4 moves downwardly the enlarged lower end or compression piston 5 thereon moving in the chamber 3 will draw in a fuel mixture from the carburetor 27 when the valve 26 is opened. On the upstroke of the piston the auxiliary exhaust valve 18 is opened for the desired length of time after the ports 9 and 10 are closed so as to permit air to escape and bring the pressure within the explosion chamber to the desired degree. This upstroke of the piston by reason of the upward movement of the compression piston 5 in the chamber 3 will compress the fuel charge and at the proper time after the auxiliary exhaust valve 18 is closed the inlet valve 16 will be opened and the fuel mixture will be forced through the by-pass 18' in cylinder 1 into the explosion chamber.

As the opening and closing of the auxiliary exhaust valve 18 are variable in order to control the compression, and also the speed, of the engine, it is desirable that the operation of the fuel intake valve 26 is also variable in order that the fuel mixture may be in proper proportion to the air within the explosion chamber.

In the embodiment of the invention illustrated in Figure 1 of the drawings, the cams 30 and 32 regulate the timing and duration of the opening of the valves 18 and 26, respectively, and this regulation may be manually adjusted through the medium of the lever 42 and the parts above described.

On the upstroke of the piston 4 it will be noted that within the chamber 3 there is a compression pressure equivalent to the compression in combustion chamber 2, and that downward movement of the piston 4 must be sufficient to allow the gas still remaining in chamber 3 to expand to at or below atmospheric pressure, the fuel inlet valve 26 being open to permit entrance of the new charge. The valve 26 need not be opened until a considerable vacuum has been created in chamber 3, and in order to regulate the volume of this charge the valve 26 may be opened before the piston has reached the bottom of its stroke or remain open until the maximum charge has been admitted, or may be closed before the piston has reached the bottom of the stroke, thus limiting the volume of fuel mixture admitted. The proportion or concentration of the fuel mixture entering the chamber 3 may, of course, to some extent be controlled by the carbureter and throttling action, but it is thought better to regulate the amount of concentrated mixture passing from the chamber 3 into the combustion chamber 2 by controlling the action of the valve 26 in relation to the action of the auxiliary exhaust valve 18, and consequently controlling the concentrated gas charge passing from the chamber 3 to the chamber 2 in proportion to the air charge confined in chamber 2 after the exhaust valve 18 has been closed.

By reason of the construction above described, I may introduce into the compression chamber 3 a mixture of fuel and air of constant proportion, and discharge into the combustion chamber 2 through the valve 16 a volume of this mixture proportionate to the amount of air allowed to remain in the chamber 2 by the regulation of the movement of the auxiliary exhaust valve 18.

In considering the operation of this engine it must be realized that the position of the closing point of the exhaust valve 18 relative to crank position influences not only the volume of air allowed to remain in chamber 2 but also the compression reduction as this valve is retarded and the air volume diminished, and also influences the volume of fuel mixture forced into the chamber 2 due to the difference in compression pressure.

Figure 3:
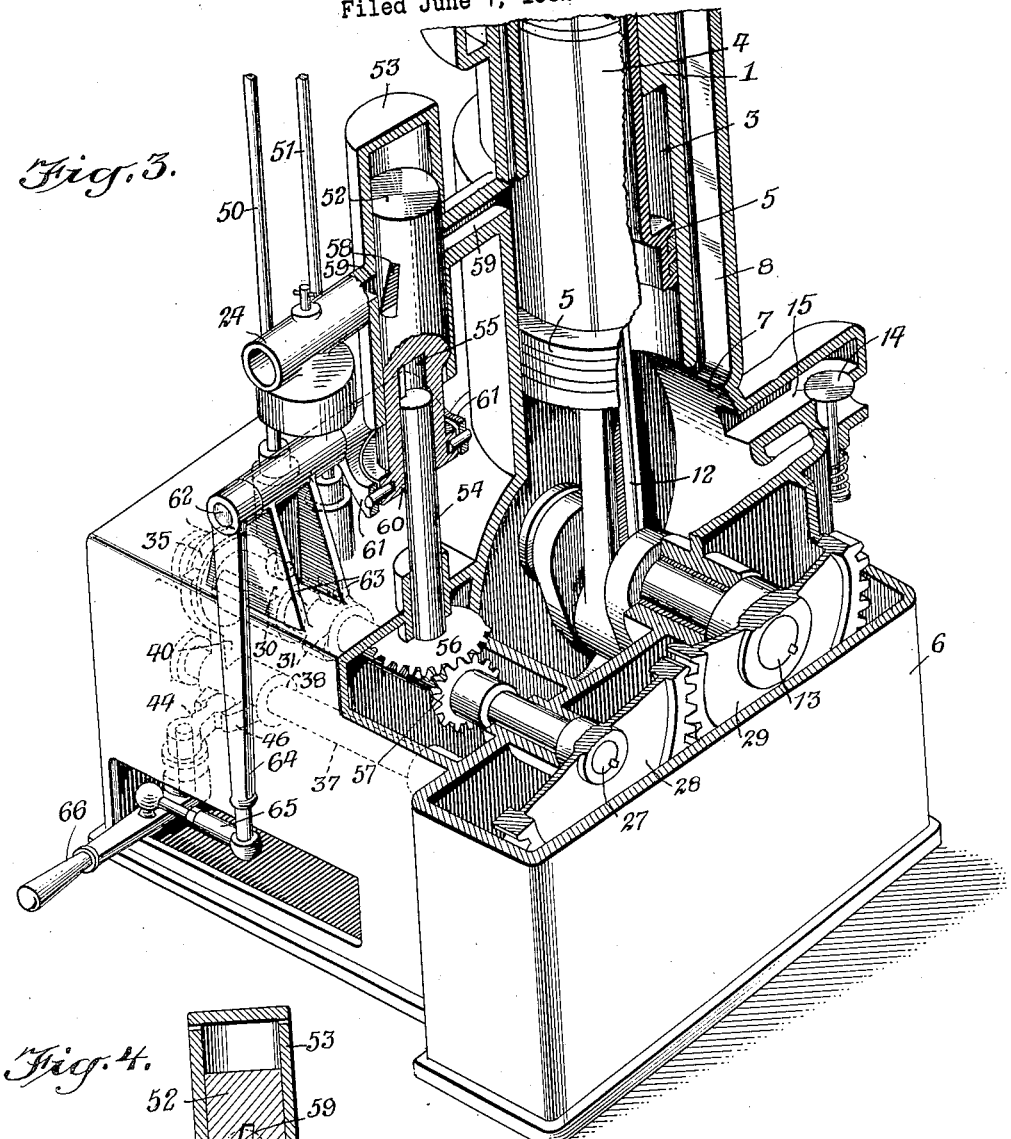
Figure 3 is a fragmentary sectional perspective view illustrating a modification.
Figure 4:
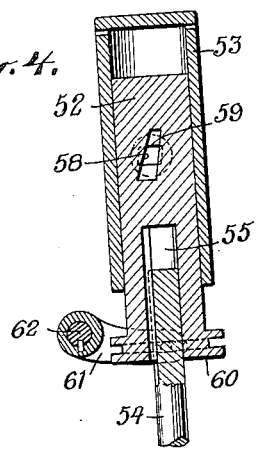
Figure 4 is an enlarged detail view in longitudinal section illustrating a fuel intake valve.

In the modification illustrated in Figures 3 and 4 of the drawings, parts of the engine which are like those in the preferred form illustrated in Figures 1 and 2 of the drawings are given the same reference characters.

The modification has to do particularly with the modified form of fuel intake valve 52 between the carburetor 24 and the compression chamber 3. This valve 52 is a rotary valve mounted in a casing 53, and turned through the medium of a shaft 54. The shaft 54 is keyed in a recess or socket 55 in the lower end of the valve, and is connected by intermeshing gears 56 and 57 with the countershaft 27. The valve 52 is formed with a port 58 extending therethrough. This port 58 is narrowest at its upper end and increases in width at its lower end, and is preferably slightly inclined with relation to the longitudinal axis of the valve and co-operates with a much smaller port 59 in the valve casing 53, so that by raising and lowering the valve 52 the time of opening and closing or duration and position of opening is regulated.

For adjusting this valve 52 vertically, I illustrate the lower end of the valve as having an annular grooved enlargement 60 thereon, engaged by a fork 61 on a rocker-shaft 62 supported in suitable brackets 63 on the base 6. A depending arm 64 on the rocker-shaft 62 is connected by a link 65 with a lever 66 corresponding in its operation and controlled through the operation of the lever 42 of the form of invention illustrated in Figure 1.

I have illustrated in dotted lines in Figure 3 cam controlled means operated through the medium of the lever 66 for operating the rod 50 to control the auxiliary exhaust valve 18, and a cam such as illustrated in Figure 1 of the drawings to operate the rod 51 controlling the fuel inlet valve 16.

The operation of the modified form of engine illustrated in Figure 3 of the drawings is the same as that described in Figure 1 of the drawings, with the exception that a modified form of fuel intake valve 52 is employed so that by raising and lowering this valve 52 the volume of fuel mixture entering the compression chamber 3 is varied.

What I claim is:

1. In an internal combustion engine, the combination with a cylinder having a combustion chamber at one end, of a fuel intake valve and an auxiliary exhaust valve in the combustion chamber, said cylinder having a main exhaust port uncovered by the piston, a working piston in the cylinder, means for forcing air into the combustion chamber to force the burnt gases through the main exhaust port and fill the chamber with air when the piston reaches the end of its working stroke, means for compressing a fuel mixture and forcing it into the air in the combustion chamber on the compression stroke of the piston, and means for varying the proportion of mixture in accordance with the time the auxiliary exhaust valve remains open.

2. In an internal combustion engine, the combination with a cylinder having a combustion chamber at one end, of a fuel intake valve and an auxiliary exhaust valve in the combustion chamber, said cylinder having a main exhaust port uncovered by the piston, a working piston in the cylinder, means for forcing air into the combustion chamber to force the burnt gases through the main exhaust port and fill the chamber with air when the piston reaches the end of its working stroke, means for compressing a fuel mixture and forcing it into the air in the combustion chamber on the compression stroke of the piston, a fuel intake valve controlling the inlet of fuel to the compression means, and means for advancing the opening and closing of the last mentioned fuel intake valve as the opening and closing of the auxiliary exhaust valve are retarded.

3. In a two-cycle internal combustion engine, the combination with a cylinder and a reciprocating piston in the cylinder, said cylinder having an exhaust port and an air inlet port, both of which are uncovered by the piston on its down stroke, a positively operated exhaust valve controlling a port in the cylinder, said exhaust valve opened with the uncovering of the said first-mentioned ports whereby the incoming air will completely displace the burnt gases and the timing of the closing of said exhaust valve will govern the speed of the engine, a positively operating inlet valve in the cylinder controlling the admission of a rich fuel mixture into the cylinder on the upstroke of the piston after the exhaust valve has closed, said exhaust valve capable of manual timing, and means for compelling a charge of fuel mixture to be discharged into the air in proportion to the air remaining in the explosion chamber.

4. A two-cycle internal combustion engine including a chamber, the upper end of which constitutes an explosion chamber, the lower end communicating with a crank case constituting an air compression chamber, and the intermediate portion of said cylinder comprising a fuel compression chamber, a working piston in the cylinder and an enlargement on the working piston constituting a compression piston for both the air and fuel compression chambers, the cylinder having an air by-pass from the crank case which is uncovered by the piston, and a fuel by-pass to the end of the cylinder, a mechanically operated fuel inlet valve controlling the fuel by-pass, said cylinder having a main exhaust port uncovered by the piston and an auxiliary exhaust port at the end of the cylinder, a mechanically operated valve controlling the exhaust port, a fuel inlet valve controlling the intake of fuel to the compression chamber, and means for varying the opening of the fuel intake valve in accordance with the operation of the exhaust valve.

5. A two-cycle internal combustion engine including a cylinder, the upper end of which constitutes an explosion chamber, the lower end communicating with a crank case constituting an air compression chamber, and the intermediate portion of said cylinder comprising a fuel compression chamber, a working piston in the cylinder, and an enlargement on the working piston constituting a compression piston for both the air and fuel compression chambers, the cylinders having an air by-pass from the crank case which is uncovered by the piston, and a fuel by-pass to the end of the cylinder, a mechanically operated fuel inlet valve controlling the fuel by-pass, said cylinder having a main exhaust port uncovered by the piston and an auxiliary exhaust port at the end of the cylinder, a mechanically operated valve controlling the exhaust port, a fuel inlet valve controlling the intake of fuel to the compression chamber, and means to advance the opening and closing time of the fuel intake valve as the timing of the exhaust valve is retarded, said controlling means including sliding cams and an operating shaft therefor having cam keys engaging the cams.

6. A two-cycle internal combustion engine including a cylinder, the upper end of which constitutes an explosion chamber, the lower end communicating with a crank case constituting an air compression chamber, and the intermediate portion of said cylinder comprising a fuel compression chamber, a working piston in the cylinder and an enlargement on the working piston constituting a compression piston for both the air and fuel compression chambers, the cylinder having an air by-pass from the crank case which is uncovered by the piston, and a fuel by-pass to the end of the cylinder, a mechanically operated fuel inlet valve controlling the fuel by-pass, said cylinder having a main exhaust port uncovered by the piston and an auxiliary exhaust port at the end of the cylinder, a mechanically operated valve controlling the exhaust port, a fuel inlet valve controlling the intake of fuel to the compression chamber, and means to advance the opening and closing time of the fuel intake valve as the timing of the exhaust valve is retarded, said fuel inlet valve comprising a longitudinally adjustable rotary member having a longitudinally extending port varying in transverse area.

7. An internal combustion engine, according to claim 1, wherein the fuel intake and auxiliary exhaust valves are operable by means including cams capable of sliding movement on an operating shaft therefor, said shaft having cam keys engaging the cams, and a single manually operable lever adapted to move the cams simultaneously along the operating shaft.

JAMES H. CRARY.